Oct. 7, 1952     J. R. KENDRICK     2,612,830
AIR CONDITIONING AND SPEAKER UNIT FOR AUTOMOBILES
Filed March 24, 1949     2 SHEETS—SHEET 1

Inventor
James R. Kendrick

By Clarence A. O'Brien
and Harvey B. Jacobson
Attorneys

Oct. 7, 1952     J. R. KENDRICK     2,612,830
AIR CONDITIONING AND SPEAKER UNIT FOR AUTOMOBILES
Filed March 24, 1949     2 SHEETS—SHEET 2
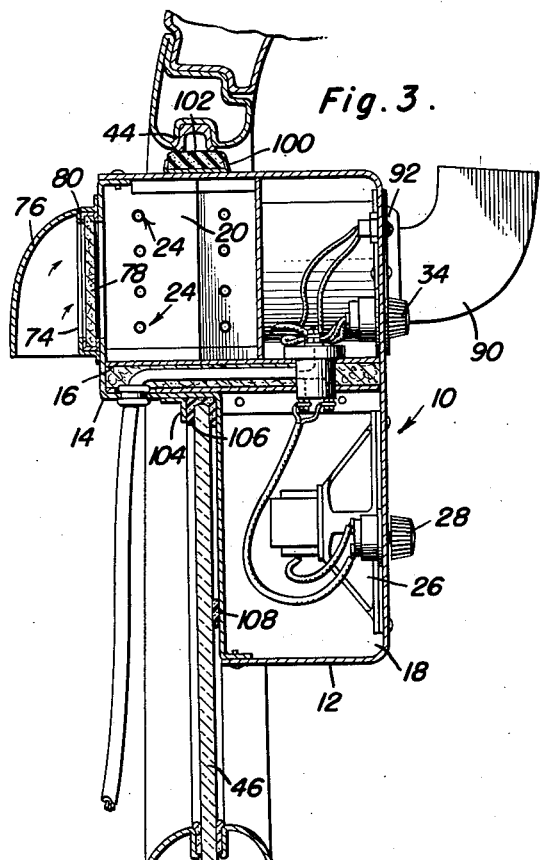
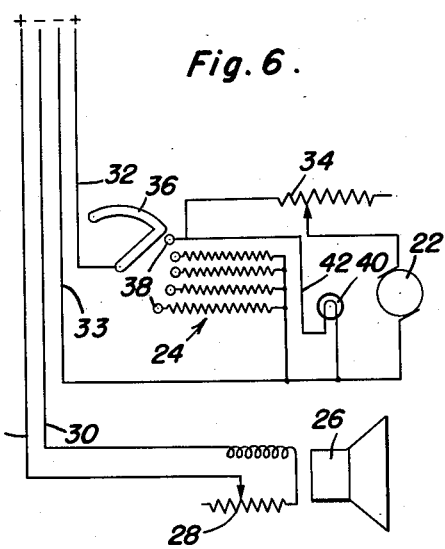
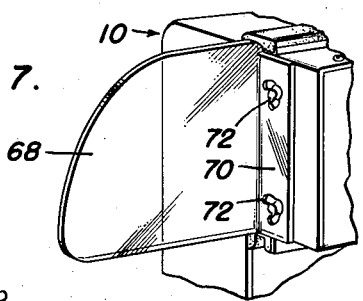
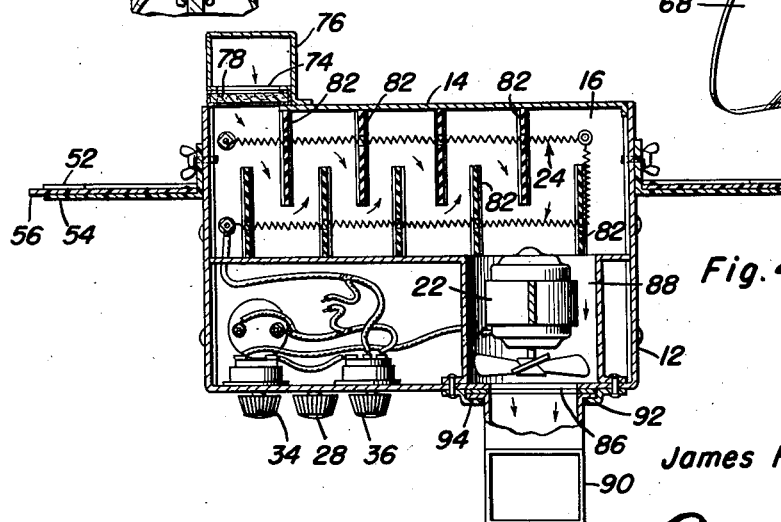
Inventor
James R. Kendrick Patented Oct. 7, 1952

2,612,830

UNITED STATES PATENT OFFICE 2,612,830

AIR CONDITIONING AND SPEAKER UNIT FOR AUTOMOBILES

James R. Kendrick, Greenville, S. C.

Application March 24, 1949, Serial No. 83,263

2 Claims. (Cl. 98—2)

This invention relates to novel and useful improvements in attachments for use in connection with window openings of vehicles adapted particularly for use in certain public entertainment places such as "open air" theaters.

An object of this invention is to operate a speaker carried by the attachment from an outside source such as the sound apparatus of the out-door theaters and to heat the interior of a vehicle by electrical means which is free from objectionable possibility of carbon monoxide poisoning such as would be encountered in using a conventional vehicle heater for the same purpose.

Another object of this invention is to draw outside, fresh air into the case which forms the major part of the attachment and pass the air through a devious travel over a heating element or elements, and then exhaust the air on the inside of the vehicle and through an adjustable baffle to direct the air wherever it is found desirable, such as the rear seat, roof, floor, or other part of the interior of the vehicle.

Another purpose of this invention is to selectively control the heater, fan and speaker, these elements being provided in the attachment.

And another object of this invention is to releasably retain the case in a part of the conventional window opening by means of resilient anchoring members which are attached to the upper part of the substantially L-shaped housing and adjacent the junction of the two legs of the substantially L-shaped housing respectively, the upper resilient member being removably disposed in the sill of the window opening and the other fastening element removably disposed on the upper edge of the window glass.

Another purpose of this invention is to supply an attachment of the character to be described, rendering it possible and practical to operate out-door theaters throughout the year and to obviate the possibility of carbon monoxide poisoning, which possibility arises in use of a conventional heater within a vehicle, necessitating the operation of the engine of the vehicle to maintain it in a warm condition.

Ancillary objects and features of novelty will become apparent to those skilled in the art, such as the panel or panels carried by the case in order to fill a portion of the window opening and, specifically, that portion above the upper edge of the window pane and below the upper part of the sill of the window whereby a substantially tight seal is effected similar to the type of seal found when the conventional window is in the full closed position.

In the drawings:

Figure 3 is a sectional view taken substantially on the line 3—3 of Figure 1 and in the direction of the arrows;

Figure 4 is a sectional view taken on the line 4—4 of Figure 2 and in the direction of the arrows;

Figure 1:
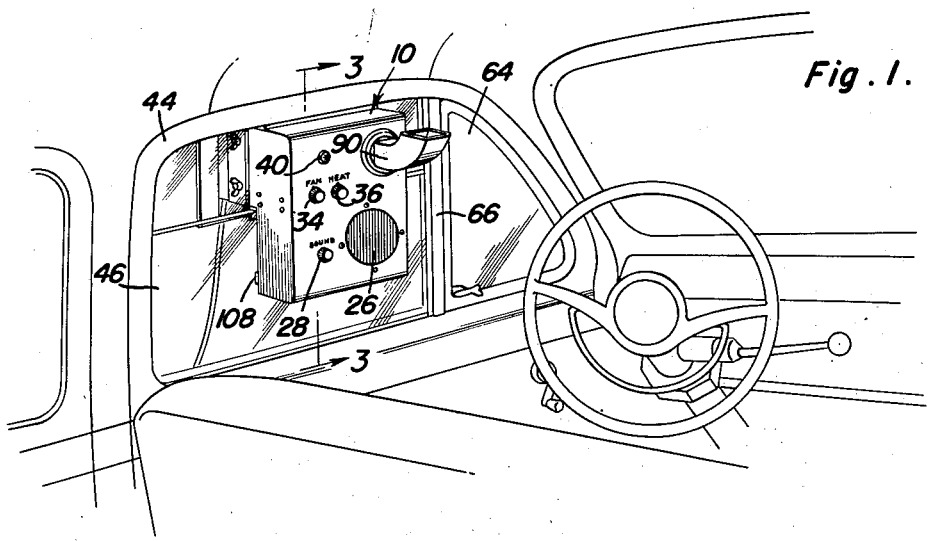
Figure 1 is a fragmentary perspective view of a typical vehicle having the invention applied in a window opening.
Figure 2:
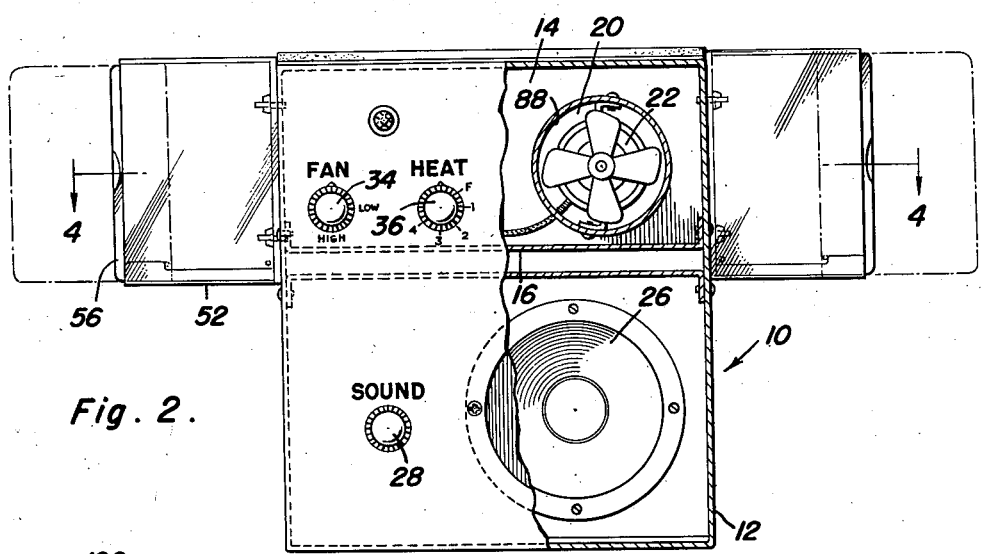
Figure 2 is a side view of the device shown in Figure 1, portions being broken away to illustrate details of construction.
Figure 5:
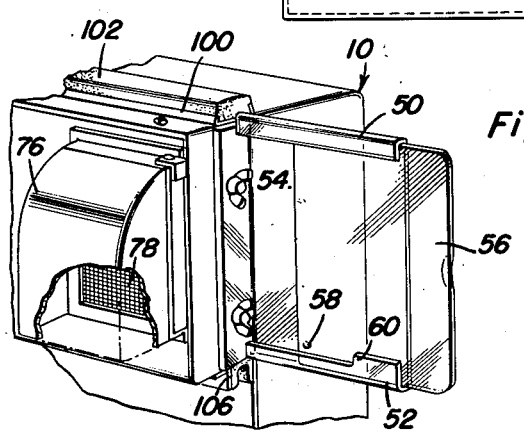
Figure 5 is a fragmentary perspective view of a portion of the device shown in Figure 1 and illustrative, primarily, of one type of panel fixed to the exterior of the case and the fresh air inlet.

Figure 6 is a typical wiring diagram of one form of wiring system and conventional appliances arranged in the case; and Figure 7 is a view illustrating a slight departure or modification of the invention, and specifically showing the use of a different type of panel which is removably carried by the outside surface of the case, this panel being specifically shaped to suit the manufacturer's make vehicle window opening.

The present invention has, for one of its prime intentions, the enlarging of the season for use of the out-door type theater, out-door concerts, mass out-door television programs and the like. Entertainment along these lines is seasonal due to the cold winter occasioned in most parts of the country. Hence, by heating the interior of the vehicle in which the customers reside, a larger inducement for customers will be present. Accordingly, the present invention incorporates the necessary speaker, together with a controllable heater and fan in a single attachment for removable disposition in a part of a window opening of a conventional vehicle.

The structure of the invention includes a substantially L-shaped case generally indicated at 10 and including what might be considered legs 12 and 14, respectively. A partition 16 is disposed in the case separating the said case into a speaker compartment 18 and a heater compartment 20. It will be noted at this point that reference is made to a heater compartment. However, this compartment is not necessarily limited to a "heater" compartment, although a heater is disposed therein. A fan 22 is also disposed in the heater compartment and may be rendered operative at such time that the heater is not in order that fresh air may be drawn into the vehicle without having the same heated first.

The essential operative elements of the invention consist of the fan and its associated motor 22, a heater generally indicated at 24, and a speaker of conventional description 26. Controls for these three elements are provided. A volume control 28 is used in connection with the speaker 26 and is in a circuit including wires 30 and 31, separate from the circuit including wires 32 and 33. The last-mentioned circuit has the heater 24 disposed therein as well as the fan motor and a rheostat 34 for the fan. A switch arm 36 is mounted for pivotal movement for successive connection with a number of contacts 38, the first of which energizes the fan motor 22 through the rheostat 34 and the others of which connect an increasingly larger number of heating elements in the circuit for operation. The type of heater disclosed is merely for illustrative purposes, any type of electrically operative heater being all that is required.

A signal lamp 40 indicating when the heater is operative, and therefore indicating when the motor 22 is operative, is connected across the first contact 38 and the line 33 by means of a conventional wire 42. Reference to the wiring diagram clearly illustrates the electrical operating principle of the device.

Some makes of vehicles have shapes of sills 44 different from others. The sill 44 is the conventional one found in any window of a vehicle of the type having a vertically movable window pane 46. Accordingly, means is provided for the purpose of filling that part of the window opening between the upper edge of the window pane 46 and below the top of the sill 44, when the case 10 is disposed therein. Two separate and slightly different means are illustrated. The first consists of a framing consisting of upper and lower channel members 50 and 52 respectively which are fixed to the side of the case 10 by any suitable conventional means. A stationary panel 54 is provided in the upper and lower tracks 50 and 52 and a movable panel 56 is juxtaposed with respect thereto. A stop pin 58 is carried by the panel 56 and engages an abutment 60 provided on the lower channel 52. This allows limited movement of an extensible nature of the panels 54 and 56 in order to fill the opening as disclosed in Figure 1. An identical structure is provided on the opposite side of the case 10. Obviously, one of the panel arrangements may be obviated and the side edge of the casing placed directly against the ventilator wing 64 when this is possible or in certain makes of vehicles against the post 66 adjacent the ventilator wing.

A slightly modified form of the invention is disclosed in Figure 6 and it is a departure from the main views in that a transparent or non-transparent panel 68 is provided with a flange 70 at its inner end and is adapted to be removably fastened to the side of the case 10. A wing nut construction 72 may be used or, if it is found desirable, simple resilient clips may be carried by the casing having the panel 68 removably inserted therein for ready removal and application. The shape of the panels is to be predetermined in accordance with the necessity of the particular vehicle; that is, a store or supply of different shaped panels to fit various types of vehicles will be at hand and one will be attached to the case immediately before the case is disposed in the window opening.

A fresh air inlet 74 is provided in the case 10, and more specifically in the leg 14 that is exterior of the vehicle. This fresh air inlet may be in the back of the case as disclosed, or bottom side of the leg 44 as found desirable. When it is in the back as disclosed, a hood 76 is disposed thereover in order to prevent rain and snow from entering the fresh air inlet. A filter 78 is disposed in the fresh air inlet opening, and more specifically, is carried in a suitable bracket or framing 80 which also supports the hood 76.

A plurality of baffles 82 is provided within the air chamber 20, requiring the air taken in the fresh air inlet to travel a devious course within the fresh air chamber so that it may pass over a large amount of heating area before it is exhausted through the heated air outlet 86 at the end of the throat 88 in the heated air chamber 20. The fan 22 is also disposed in this throat, and there is an adjustable baffle 90 disposed within the interior of the vehicle when the attachment is in place and in communication with the heated air outlet 86. This baffle is preferably in the form of a small curved duct which is rotatable in a circular bearing 92 carried by the case through the medium of a peripheral flange 94 fixed rigidly to the small duct-shaped baffle 90.

Means removably fastening the case in the window opening as described is provided. This means is resilient in nature and consists of a channel 100 carried by the upper surface of the case 10 and having a resilient strip 102 therein fitted in the slot in the upper sill 44. A lower channel is formed by an L-shaped member 104 carried by the case adjacent the junction of the two legs 14 and 12 respectively and has a resilient lining 106 disposed therein adapted for engagement with the upper edge of the window 46. A resilient pad is carried by the leg 12 and is indicated at 108. This resilient pad engages the inner surface of the window pane 46 for steadying the entire device.

It is apparent that variations may be made without departing from the spirit of the invention.

Having described the invention, what is claimed as new is:

1. An attachment for use in a vehicle window opening having a vertically sliding pane for closing same, said attachment comprising a generally L-shaped case having a horizontal portion and a vertical portion, said horizontal portion being adapted to be disposed between the upper edge of said pane and the top of said window opening with the vertical portion disposed within the vehicle, the lower surface of said horizontal portion being provided with a channel strip adapted to receive the upper edge of the pane and position said case in said window opening, a heater structure mounted in the horizontal portion, said vertical portion being adapted to support a loud speaker and control means for said heater, said heater structure including an air inlet opening in the outer side of said horizontal portion, a longitudinally offset air outlet on the inner side of said horizontal portion, a tortuous passageway connecting said inlet and outlet opening, heating means disposed in said tortuous passageway for heating air passing therethrough, a blower mounted within said passageway adjacent said outlet opening.

2. The attachment of claim 1 wherein said tortuous passageway is formed by a plurality of staggered baffles and said heating means includes heating coils extending between said baffles and supported thereby in the path of air flowing through said tortuous passageway.

JAMES R. KENDRICK.

REFERENCES CITED

The following references are of record in the file of this patent:

UNITED STATES PATENTS

| Number | Name | Date |
|---|---|---|
| 1,650,918 | Whitesel | Nov. 29, 1927 |
| 1,718,083 | Segelken | June 18, 1929 |
| 1,829,765 | Spalding | Nov. 3, 1931 |
| 1,942,225 | Tibbetts | Jan. 2, 1934 |
| 1,952,514 | Selby | Mar. 27, 1934 |
| 2,072,744 | Findley | Mar. 2, 1937 |
| 2,091,594 | Innes | Aug. 31, 1937 |
| 2,230,020 | Webster | Jan. 28, 1941 |
| 2,435,798 | Rice et al. | Feb. 10, 1948 |
| 2,463,339 | Wetzel et al. | Mar. 1, 1949 |
| 2,459,986 | Phyfe | May 10, 1949 |
| 2,529,425 | Sharp | Nov. 7, 1950 |
| 2,535,424 | Josephson | Dec. 26, 1950 |

FOREIGN PATENTS

| Number | Country | Date |
|---|---|---|
| 299,626 | Great Britain | Nov. 1, 1928 |